(12) United States Patent
Suh et al.

(10) Patent No.: US 12,139,129 B2
(45) Date of Patent: Nov. 12, 2024

(54) APPARATUS FOR CONTROLLING MOTION OF VEHICLE AND METHOD THEREOF

(71) Applicants: HYUNDAI MOTOR COMPANY, Seoul (KR); Kia Corporation, Seoul (KR); Korea University Of Technology And Education Industry-University Cooperation Foundation, Cheonan-si (KR)

(72) Inventors: Jee Yoon Suh, Incheon (KR); Seung Han You, Seoul (KR); Wan Ki Cho, Cheonan-si (KR); Han Byeol Gil, Cheonan-si (KR); Chang Jun Jeon, Cheonan-si (KR)

(73) Assignees: HYUNDAI MOTOR COMPANY, Seoul (KR); Kia Corporation, Seoul (KR); Korea University of Technology and Education Industry-University Cooperation Foundation, Cheonan-si (KR)

( * ) Notice: Subject to any disclaimer, the term of this patent is extended or adjusted under 35 U.S.C. 154(b) by 3 days.

(21) Appl. No.: 17/890,619

(22) Filed: Aug. 18, 2022

(65) Prior Publication Data

US 2023/0192068 A1 Jun. 22, 2023

(30) Foreign Application Priority Data

Dec. 17, 2021 (KR) ........................ 10-2021-0182106

(51) Int. Cl.
*B60W 30/02* (2012.01)
*B60W 40/103* (2012.01)
(Continued)

(52) U.S. Cl.
CPC .......... *B60W 30/02* (2013.01); *B60W 40/103* (2013.01); *B60W 40/114* (2013.01);
(Continued)

(58) Field of Classification Search
CPC .. B60W 30/02; B60W 40/103; B60W 40/114; B60W 60/0013; B60W 2510/18;
(Continued)

(56) References Cited

U.S. PATENT DOCUMENTS 8,285,474 B2 10/2012 Doi
8,838,336 B2 9/2014 Hirao et al.
(Continued)

FOREIGN PATENT DOCUMENTS

JP H11-78952 A 3/1999
JP 3733929 B2 1/2006
(Continued)

OTHER PUBLICATIONS

Abe Masato, Vehicle Handling Dynamics: Chapter 3: Fundamentals of Vehicle Dynamics, 2015, Elsevier Ltd., pp. 48-52 (Year: 2015).*

*Primary Examiner* — Aniss Chad
*Assistant Examiner* — Chase L Cooley
(74) *Attorney, Agent, or Firm* — MORGAN, LEWIS & BOCKIUS LLP (57) ABSTRACT

The present disclosure relates to an apparatus for controlling the motion of a vehicle to improve riding comfort, and a method thereof. According to an embodiment of the present disclosure, a processor may determine a boarding location for a user and may determine a vehicle control signal in consideration of riding comfort according to acceleration or jerk based on the boarding location. A controller may control the vehicle depending on the vehicle control signal.

14 Claims, 9 Drawing Sheets

(51) Int. Cl.
*B60W 40/114* (2012.01)
*B60W 60/00* (2020.01)

(52) U.S. Cl.
CPC ..... *B60W 60/0013* (2020.02); *B60W 2510/18* (2013.01); *B60W 2510/20* (2013.01); *B60W 2520/105* (2013.01); *B60W 2520/125* (2013.01); *B60W 2520/14* (2013.01); *B60W 2520/20* (2013.01); *B60W 2520/28* (2013.01); *B60W 2710/18* (2013.01); *B60W 2710/20* (2013.01); *B60W 2720/106* (2013.01)

(58) Field of Classification Search
CPC ....... B60W 2510/20; B60W 2520/105; B60W 2520/125; B60W 2520/14; B60W 2520/20; B60W 2520/28; B60W 2710/18; B60W 2710/20; B60W 2720/106
See application file for complete search history.

(56) References Cited

U.S. PATENT DOCUMENTS

| | | | |
|---|---|---|---|
| 10,766,468 B2 | 9/2020 | Zhang et al. | |
| 2005/0049761 A1* | 3/2005 | Kataoka | B60W 10/18 |
| | | | 702/56 |
| 2012/0029770 A1 | 2/2012 | Hirao et al. | |
| 2017/0137023 A1* | 5/2017 | Anderson | B60W 50/14 |

FOREIGN PATENT DOCUMENTS

| | | |
|---|---|---|
| JP | 2010-253978 A | 11/2010 |
| JP | 5029329 B2 * | 9/2012 |
| KR | 10-1526621 B1 | 6/2015 |
| KR | 10-1626163 B1 | 5/2016 |
| KR | 10-1836490 B1 | 3/2018 |
| KR | 10-2018-0066363 A | 6/2018 |

* cited by examiner

APPARATUS FOR CONTROLLING MOTION OF VEHICLE AND METHOD THEREOF

CROSS-REFERENCE TO RELATED APPLICATION

This application claims the benefit of priority to Korean Patent Application No. 10-2021-0182106, filed in the Korean Intellectual Property Office on Dec. 17, 2021, the entire contents of which are incorporated herein by reference.

TECHNICAL FIELD

The present disclosure relates to a vehicle motion control apparatus and a method thereof, and more particularly, relates to an apparatus for controlling the motion of a vehicle to improve riding comfort, and a method thereof.

BACKGROUND

With the development of autonomous driving technology capable of reducing a driver's fatigue by performing driving, braking, and steering on behalf of the driver, a vehicle is providing a function to provide a service providing place as well as a simple means of transportation. According to a change in automobile paradigm, future mobility needs to provide passengers with a service of comfortable riding comfort on the move. When the autonomous driving function is successfully developed, an autonomous vehicle may provide a driving service to a destination by autonomously driving while a passenger is sitting in a seat other than a driver's seat.

A conventional vehicle control system has performed optimal behavior control at a location of a center of gravity on a vehicle model based on the center of gravity of a vehicle. However, when performing the vehicle's behavior control through a vehicle model considering a passenger's boarding location, the vehicle control system may provide a user with better riding comfort, thereby requiring the development of such a technology. In particular, in the case of an autonomous vehicle having various locations of passengers, it is more necessary to control the vehicle behavior according to the passenger's boarding location.

SUMMARY

The present disclosure has been made to solve the above-mentioned problems occurring in the prior art while advantages achieved by the prior art are maintained intact.

An aspect of the present disclosure provides an apparatus for controlling the motion of a vehicle to improve riding comfort, and a method thereof.

An aspect of the present disclosure provides a vehicle motion control apparatus for providing driving stability to a passenger of an autonomous vehicle, and a method thereof.

An aspect of the present disclosure provides a vehicle motion control apparatus for improving the riding comfort of a passenger in a turning situation of a four-wheel steering vehicle, and a method thereof.

An aspect of the present disclosure provides a vehicle motion control apparatus for improving riding comfort for future mobility having a high degree of control, and a method thereof.

An aspect of the present disclosure provides a vehicle motion control apparatus for providing specialized ride comfort to a passenger at a specific location, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle motion control apparatus may include a processor provided in a vehicle and determining a boarding location for a user and determining a vehicle control signal in consideration of riding comfort according to acceleration or jerk based on the boarding location and a controller controlling the vehicle depending on the vehicle control signal.

In an embodiment, the vehicle motion control apparatus may further include an input device receiving information about the boarding location from the user. The processor may determine the boarding location based on the information about the boarding location received from the user.

In an embodiment, the vehicle motion control apparatus may further include a seating sensor detecting whether the user is seated at a seat of the vehicle. The processor may determine the boarding location based on detection information of the seating sensor.

In an embodiment, the processor may determine the vehicle control signal including at least one of a steering signal, a driving signal, or a braking signal for the vehicle. The controller may perform at least one of steering control, driving control, or braking control of the vehicle depending on the vehicle control signal.

In an embodiment, the processor may calculate a target behavior at the boarding location to minimize the acceleration or the jerk at the boarding location.

In an embodiment, the target behavior at the boarding location may include a target lateral slip angle and a target yaw rate at the boarding location.

In an embodiment, the processor may calculate a target behavior for a center of gravity of the vehicle corresponding to the calculated target behavior at the boarding location.

In an embodiment, the target behavior for the center of gravity may include a target lateral slip angle and a target yaw rate for the center of gravity.

In an embodiment, the processor may calculate at least one of a steering angle, a driving torque, or a braking torque of the vehicle corresponding to the calculated target behavior for the center of gravity.

In an embodiment, the processor may calculate the at least one of the steering angle, the driving torque, or the braking torque of the vehicle through a kinetic model or an inverse kinetic model based on the target lateral slip angle and the target yaw rate for the center of gravity.

In an embodiment, the vehicle motion control apparatus may further include a sensor device obtaining information about at least one of a wheel speed, a longitudinal acceleration, a lateral acceleration, a yaw rate, a steering angle, a driving torque, or a braking torque of the vehicle. The processor may feed back at least one of a steering angle, a driving torque, or a braking torque based on the target behavior for the center of gravity and the information obtained by the sensor device.

According to an aspect of the present disclosure, a vehicle motion controlling method may include determining, by a processor provided in a vehicle, a boarding location for a user, determining, by the processor, a vehicle control signal in consideration of riding comfort according to acceleration or jerk based on the boarding location, and controlling, by a controller, the vehicle depending on the vehicle control signal.

In an embodiment, the vehicle motion controlling method may further include receiving, by an input device, information about the boarding location from the user. the determining, by the processor, of the boarding location for the user may include determining, by the processor, the boarding location based on the information about the boarding location received from the user.

In an embodiment, the vehicle motion controlling method may further include detecting, by a seating sensor provided in the vehicle, whether the user is seated at a seat of the vehicle. The determining, by the processor, of the boarding location for the user may include determining, by the processor, the boarding location based on detection information of the seating sensor.

In an embodiment, the determining, by the processor, of the vehicle control signal may include outputting, by the processor, the vehicle control signal including at least one of a steering signal, a driving signal, or braking signal for the vehicle. The controlling, by the controller, of the vehicle depending on the vehicle control signal may include performing, by the controller, at least one of steering control, driving control, or braking control of the vehicle depending on the vehicle control signal.

In an embodiment, the determining, by the processor, of the vehicle control signal may include calculating, by the processor, a target behavior including a target lateral slip angle and a target yaw rate at the boarding location, which minimizes the acceleration or the jerk at the boarding location.

In an embodiment, the determining, by the processor, of the vehicle control signal may further include calculating, by the processor, a target behavior including a target lateral slip angle and a target yaw rate for a center of gravity of the vehicle corresponding to the calculated target behavior at the boarding location.

In an embodiment, the determining, by the processor, of the vehicle control signal may further include calculating, by the processor, at least one of a steering angle, a driving torque, or a braking torque of the vehicle corresponding to the calculated target behavior for the center of gravity.

In an embodiment, the determining, by the processor, of the vehicle control signal may further include calculating, by the processor, at least one of the steering angle, the driving torque, or the braking torque of the vehicle through a kinetic model or an inverse kinetic model based on the target lateral slip angle and the target yaw rate for the center of gravity.

In an embodiment, the vehicle motion controlling method may further include obtaining, by a sensor device provided in the vehicle, information about at least one of a wheel speed, a longitudinal acceleration, a lateral acceleration, a yaw rate, a steering angle, a driving torque, or a braking torque of the vehicle and feeding back, by the processor, at least one of a steering angle, a driving torque, or a braking torque based on the target behavior for the center of gravity and the information obtained by the sensor device.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the accompanying drawings. In adding reference numerals to components of each drawing, it should be noted that the same components have the same reference numerals, although they are indicated on another drawing. Furthermore, in describing the embodiments of the present disclosure, detailed descriptions associated with well-known functions or configurations will be omitted when they may make subject matters of the present disclosure unnecessarily obscure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various embodiments of the present disclosure will be described in detail with reference to FIGS. 1 to 9.

Figure 1:
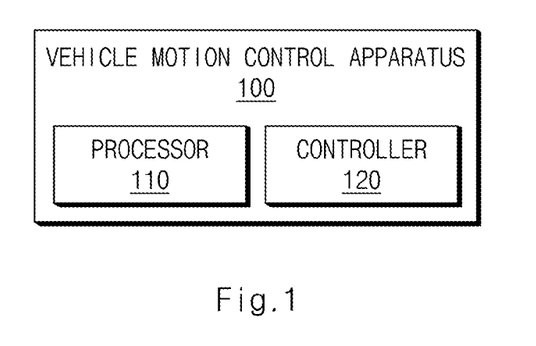
FIG. 1 is a block diagram illustrating a vehicle motion control apparatus, according to an embodiment of the present disclosure.

FIG. 1 is a block diagram illustrating a vehicle motion control apparatus, according to an embodiment of the present disclosure.

A vehicle motion control apparatus 100 according to an embodiment of the present disclosure may be implemented inside or outside a vehicle. At this time, the vehicle motion control apparatus 100 may be integrated with internal control units of a vehicle and may be implemented with a separate hardware device so as to be connected to control units of the vehicle by means of a connection means.

For example, the vehicle motion control apparatus 100 may be implemented integrally with a vehicle or may be implemented in a form installed/attached to the vehicle as a configuration separate from the vehicle. Alternatively, a part of vehicle motion control apparatus 100 may be implemented integrally with the vehicle, and the other parts may be implemented in a form installed/attached to the vehicle as a configuration separate from the vehicle.

Referring to FIG. 1, the vehicle motion control apparatus 100 may include a processor 110 and a controller 120.

The processor 110 may be electrically connected to the controller 120, an input device (not shown), a seating sensor (not shown), a sensor device (not shown), and the like, may electrically control each of the components, may include an electrical circuit that executes instructions of the software, and may perform various data processing and calculation described below. The processor 110 may include, for example, an electronic control unit (ECU), a Micro Controller Unit (MCU), or another sub-controller, which is mounted in the vehicle.

The processor 110 may be provided in the vehicle so as to determine a boarding location of a user.

For example, the processor 110 may determine the boarding location based on information about the boarding location entered by the user.

Although not illustrated, the vehicle motion control apparatus 100 may further include an input device that receives information about the boarding location from the user.

For example, the input device (not illustrated) may include an input button. The input button may be implemented through a push button or a button implemented through a touch screen.

For example, the input device (not illustrated) may include an input button that allows the user to directly select a boarding location, an input button that allows the processor 110 to automatically detect the boarding location, and/or an input button that allows the boarding location to be regarded as a preset default boarding location.

The input device (not illustrated) may be connected to the processor 110 through wireless or wired communication so as to directly or indirectly deliver the entered information to the processor 110.

For example, the processor 110 may determine the boarding location based on the sensing information of the seating sensor.

For example, when a signal is received from the input device (not illustrated) to automatically detect the boarding location, the processor 110 may determine the boarding location based on the sensing information of the seating sensor.

Although not illustrated, the vehicle motion control apparatus 100 may further include a seating sensor that detects whether a user is seated in a seat of the vehicle.

For example, the seating sensor is provided on each seat of the vehicle so as to determine whether a user is seated in each seat.

The seating sensor may be connected to the processor 110 through wireless or wired communication so as to directly or indirectly deliver the entered information to the processor 110.

The processor 110 may output a vehicle control signal in consideration of riding comfort according to acceleration or jerk based on the boarding location.

For example, the processor 110 may deliver the output vehicle control signal to the controller 120.

For example, the processor 110 may output the vehicle control signal including at least one of a steering signal, a driving signal, or a braking signal for a vehicle.

For example, the steering signal may include information about the vehicle's target steering angle.

For example, the driving signal may include information about the vehicle's target driving force or target driving torque.

For example, the braking signal may include information about the vehicle's target braking force or target braking torque.

For example, the processor 110 may calculate a target behavior at the boarding location, which minimizes acceleration or jerk at the boarding location.

When the acceleration or jerk at the boarding location is minimized, the riding comfort experienced by the user boarding at the boarding location may be improved.

For example, the target behavior at the boarding location may include a target lateral slip angle and a target yaw rate at the boarding location.

For example, the processor 110 may calculate the target lateral slip angle and target yaw rate at the boarding location, which minimizes the acceleration or jerk at the boarding location, through a vehicle's kinematic equation for the longitudinal/lateral acceleration or jerk based on the boarding location.

The detailed description that the processor 110 calculates the target lateral slip angle and target yaw rate at the boarding location through the vehicle's kinematic equation will be described in detail later with reference to FIG. 6.

For example, the processor 110 may calculate a target behavior for the center of gravity of the vehicle corresponding to the calculated target behavior at the boarding location.

For example, the target behavior for the center of gravity may include a target lateral slip angle and a target yaw rate for the center of gravity.

For example, the processor 110 may calculate the lateral slip angle of the center of gravity based on the lateral slip angle at the boarding location through a relational equation between the lateral slip angle at the boarding location and the lateral slip angle of the vehicle's center of gravity, For example, the processor 110 may calculate the yaw rate of the center of gravity based on the yaw rate at the boarding location through a relational equation between the yaw rate at the boarding location and the yaw rate of the vehicle's center of gravity.

The detailed description that the processor 110 calculates the target behavior for the center of gravity of the vehicle corresponding to the target behavior at the boarding location will be described in detail later with reference to FIG. 4.

For example, the processor 110 may calculate at least one of a steering angle, a driving torque, or a braking torque of the vehicle, which corresponds to the calculated target behavior for the center of gravity.

For example, the processor 110 may calculate at least one of a front-wheel steering angle, a rear-wheel steering angle, a front-wheel driving torque, a rear-wheel driving torque, a front-wheel braking torque, or a rear-wheel braking torque of the four-wheel drive vehicle.

Here, because the vehicle's driving torque/braking torque corresponds to the vehicle's driving force/braking force of one-to-one, it is obvious that the calculating, by the processor 110, of the driving torque/braking torque is the same as the calculating, by the processor 110, of the driving force/braking force.

For example, on the basis of the target lateral slip angle and target yaw rate for the center of gravity, the processor 110 may calculate at least one of a steering angle, a driving torque, or a braking torque of the vehicle through a kinetic model or an inverse kinetic model.

For example, on the basis of the target lateral slip angle and target yaw rate for the center of gravity, the processor 110 may calculate at least one of a steering angle, a driving torque, or a braking torque of the vehicle through the kinetic model or the inverse kinetic model based on a bicycle model, which simplifies the lateral movement of the vehicle.

The detailed description that the processor 110 calculates at least one of the vehicle's steering angle, driving torque, or braking torque will be described in detail later with reference to FIG. 7.

Although not illustrated, the vehicle motion control apparatus 100 may further include a sensor device configured to obtain information about at least one of the vehicle's wheel speed, longitudinal acceleration, lateral acceleration, yaw rate, steering angle, driving torque, or braking torque.

For example, the sensor device (not illustrated) may include one or more sensors that obtain information about at least one of the vehicle's wheel speed, longitudinal acceleration, lateral acceleration, yaw rate, front-wheel steering angle, rear-wheel steering angle, front-wheel driving torque, rear-wheel driving torque, front-wheel braking torque, or rear-wheel braking torque.

For example, the sensor device (not illustrated) may obtain information about the actual behavior of the vehicle in real time and may deliver the information to the processor 110.

For example, the processor 110 may feed back at least one of a steering angle, a driving torque, or a braking torque based on the target behavior for the center of gravity and the information obtained by the sensor device (not illustrated).

For example, the processor 110 may feed back at least one of a steering angle, a driving torque, or a braking torque based on a difference between a target steering angle, a target driving torque, or a target braking torque and an actual vehicle steering angle, an actual driving torque, or an actual braking torque, which is measured in real time.

For example, the processor 110 may correct the target steering angle, the target driving torque, or target braking torque by reflecting a difference between a target value and the sensed actual value.

The controller 120 may control the vehicle's behavior. The controller 120 may be implemented in the form of hardware, may be implemented in the form of software, or may be implemented in the form of the combination of hardware and software. Favorably, the controller 120 may be implemented as a microprocessor, but is not limited thereto. In addition, the controller 120 may perform various data processing and calculations, which will be described later for vehicle behavior control.

The controller 120 may control a vehicle according to the vehicle control signal output from the processor 110.

For example, the controller 120 may perform at least one of the vehicle's steering control, driving control, or braking control depending on a vehicle control signal.

For example, the controller 120 may include the vehicle's steering control apparatus, driving control apparatus, and/or braking control apparatus.

For example, the controller 120 may control at least one of a front-wheel steering angle, a rear-wheel steering angle, a front-wheel driving torque, a rear-wheel driving torque, a front-wheel braking torque, or a rear-wheel braking torque of the four-wheel drive vehicle based on the target control amount calculated by the processor 110.

Figure 2:
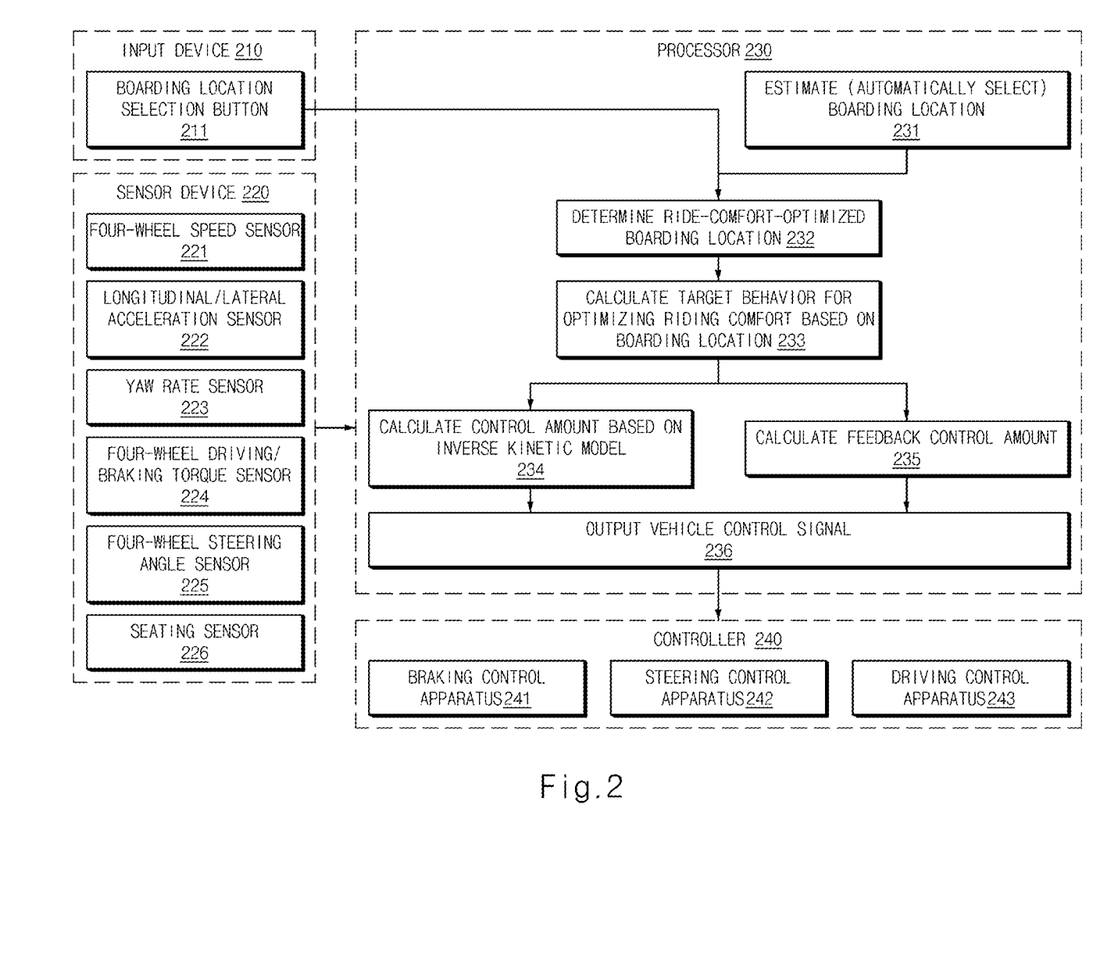
FIG. 2 is a diagram illustrating a detailed configuration of a vehicle motion control apparatus, according to an embodiment of the present disclosure.

FIG. 2 is a diagram illustrating a detailed configuration of a vehicle motion control apparatus, according to an embodiment of the present disclosure.

Referring to FIG. 2, an input device 210 may include a boarding location selection button 211.

For example, the input device 210 may receive a signal indicating a boarding location from a user through the boarding location selection button 211.

The user may directly select a boarding location through the boarding location selection button 211 or may allow the boarding location to be selected automatically.

The input device 210 is described as a button. However, the input device 210 may be implemented to receive information about a boarding location from the user through a user interface (UI) through a touch screen or the like.

A sensor device 220 may include a four-wheel speed sensor 211, a longitudinal/lateral acceleration sensor 222, a yaw rate sensor 223, a four-wheel driving/braking torque sensor 224, a four-wheel steering angle sensor 225, and a seating sensor 226.

For example, the sensor device 220 may sense a front-wheel speed and a rear-wheel speed in real time through the four-wheel speed sensor 211.

For example, the sensor device 220 may sense the longitudinal acceleration and the lateral acceleration of the vehicle and in real time through the longitudinal/lateral acceleration sensor 222.

For example, the sensor device 220 may sense the yaw rate of the vehicle in real time through the yaw rate sensor 223.

For example, the sensor device 220 may sense the vehicle's front-wheel driving torque, rear-wheel driving torque, front-wheel braking torque, and rear-wheel braking torque in real time through the four-wheel driving/braking torque sensor 224.

For example, the sensor device 220 may sense the front-wheel steering angle and the rear-wheel steering angle of the vehicle in real time through the four-wheel steering angle sensor 225.

For example, the sensor device 220 may detect whether a user is seated at each seat of the vehicle through the seating sensor 226.

For example, the sensor device 220 may deliver the sensed information to a processor 230.

The processor 230 may estimate (automatically select) a boarding location (231).

For example, when a signal for automatically selecting a boarding location is entered through the boarding location selection button 211, the processor 230 may estimate the boarding location.

For example, the processor 230 may select a boarding location based on seating information sensed through the seating sensor 226.

The processor 230 may determine a ride-comfort-optimized boarding location based on information entered through the boarding location selection button 211 and/or information obtained by estimating the boarding location (232).

The ride-comfort-optimized boarding location means a reference location for optimizing ride comfort, and may be determined as a boarding location.

The processor 230 may calculate a target behavior for optimizing the riding comfort based on the boarding location (233).

For example, the processor 230 may calculate the target behavior at the boarding location for optimizing the riding comfort based on the boarding location and then may calculate the target behavior of the vehicle's center of gravity corresponding to the calculated target behavior at the boarding location.

The processor 230 may calculate the target control amount of the vehicle by using the inverse kinetic model based on the calculated target behavior (234).

The processor 230 may calculate a feedback control amount based on the calculated target behavior and vehicle behavior information sensed in real time (235).

The processor 230 may output a vehicle control signal based on the calculated inverse kinetic model-based control amount and the feedback control amount (236).

For example, the processor 230 may reflect the target control amount calculated by using the inverse kinetic model in a form of a feed forward and then may output the vehicle control signal obtained by reflecting the feedback control amount in the form of feedback.

A controller 240 may include a braking control apparatus 241, a steering control apparatus 242, and a driving control apparatus 243.

The controller 240 may perform front-wheel braking control and rear-wheel braking control of the vehicle through the braking control apparatus 241 based on the vehicle control signal.

The controller 240 may perform front-wheel steering control and rear-wheel steering control of the vehicle through the steering control apparatus 242 based on the vehicle control signal.

The controller 240 may perform front-wheel driving control and rear-wheel driving control of the vehicle through the driving control apparatus 243 based on the vehicle control signal.

Figure 3:
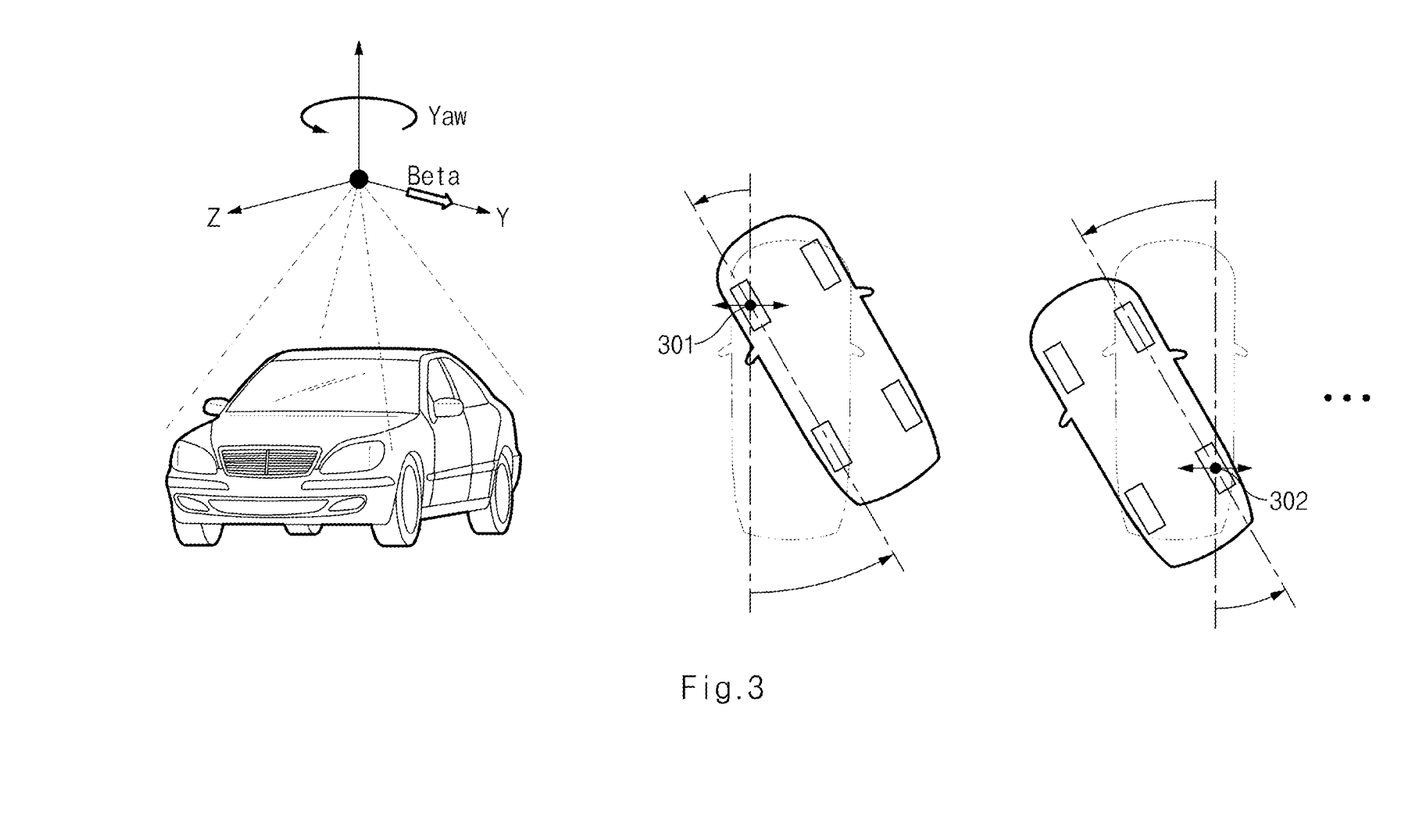
FIG. 3 is a diagram illustrating that a vehicle motion control apparatus controls a lateral slip angle and yaw rate of a vehicle, according to an embodiment of the present disclosure.

FIG. 3 is a diagram illustrating that a vehicle motion control apparatus controls a lateral slip angle and yaw rate of a vehicle, according to an embodiment of the present disclosure.

Referring to FIG. 3, a location (301, 302) of a passenger may be changed for each driving of a vehicle.

The acceleration corresponding to the passenger's feeling or the jerk corresponding to a change amount per hour of acceleration may be changed depending on the passenger's location (301, 302).

Accordingly, the vehicle motion control apparatus 100 may calculate a lateral slip angle (beta) and/or yaw rate of the passenger's location (301, 302) that minimizes acceleration or jerk according to the passenger's location (301, 302).

The vehicle motion control apparatus 100 may automatically detect the passenger's location (301, 302) or may receive information about the boarding location selected directly by a user.

The vehicle motion control apparatus 100 may calculate a control amount for driving, braking, and steering of the vehicle based on the calculated lateral slip angle and/or the calculated yaw rate at the passenger's location (301, 302) and then may perform vehicle control depending on the calculated control amount.

Figure 4:
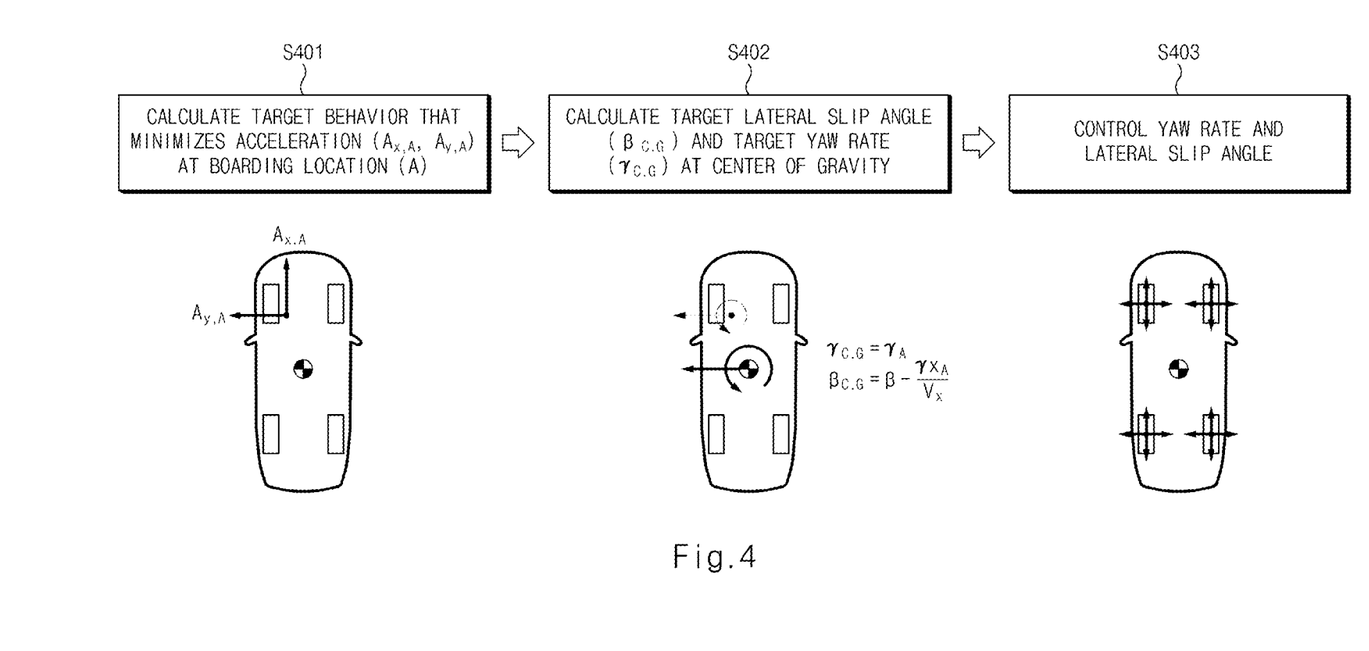
FIG. 4 is a diagram illustrating a process in which a vehicle motion control apparatus controls a lateral slip angle and yaw rate of a vehicle, according to an embodiment of the present disclosure.

FIG. 4 is a diagram illustrating a process in which a vehicle motion control apparatus controls a lateral slip angle and yaw rate of a vehicle, according to an embodiment of the present disclosure.

Referring to FIG. 4, the vehicle motion control apparatus 100 may calculate a target behavior that minimizes acceleration ($A_{x,A}$, $A_{y,A}$) at a boarding location (A) (S401).

For example, the vehicle motion control apparatus 100 may calculate a target lateral slip angle and target yaw rate of the boarding location reference (A) that minimizes the acceleration ($A_{x,A}$, $A_{y,A}$) at the boarding location (A).

The vehicle motion control apparatus 100 may calculate a target lateral slip angle ($\beta_{C.G}$) and a target yaw rate ($\gamma_{C.G}$) at a center of gravity (C.G) (S402).

For example, the vehicle motion control apparatus 100 may calculate the target lateral slip angle ($\beta_{C.G}$) and the target yaw rate ($\gamma_{C.G}$) at the center of gravity (C.G) based on the calculated lateral slip angle and the calculated yaw rate of the boarding location reference (A).

The vehicle motion control apparatus 100 may calculate the target lateral slip angle ($\beta_{C.G}$) and the target yaw rate ($\gamma_{C.G}$) at the center of gravity (C.G) through Equation 1 below.

$$\gamma_{C.G} = \gamma_A \qquad \text{[Equation 1]}$$
$$\beta_{C.G} = \beta_A - \frac{\gamma x_A}{V_x}$$

Here, $\gamma_{C.G}$ may denote a target yaw rate at the center of gravity (C.G) of a vehicle; $\gamma_A$ may denote a target yaw rate at the boarding location (A); and, $\gamma$ may denote a target yaw rate of the vehicle having a value the same as $\gamma_{C.G}$ or $\gamma_A$.

Furthermore, in Equation 1, $\beta_{C.G}$ may denote a target lateral slip angle at the center of gravity (C.G); $\beta_A$ may denote a target lateral slip angle at the boarding location (A); $V_x$ may denote a longitudinal speed of the vehicle; and, $x_A$ may denote a longitudinal distance from the center of gravity (C.G) to the boarding location (A).

The vehicle motion control apparatus 100 may control the yaw rate and lateral slip angle of the vehicle (S403).

For example, the vehicle motion control apparatus 100 may control the vehicle's yaw rate and lateral slip angle based on the calculated target lateral slip angle ($\beta_{C.G}$) and the calculated target yaw rate ($\gamma_{C.G}$) at the center of gravity (C.G).

For example, the vehicle motion control apparatus 100 may control the vehicle's yaw rate and lateral slip angle through the vehicle's driving control, braking control, and steering control.

Figure 5:
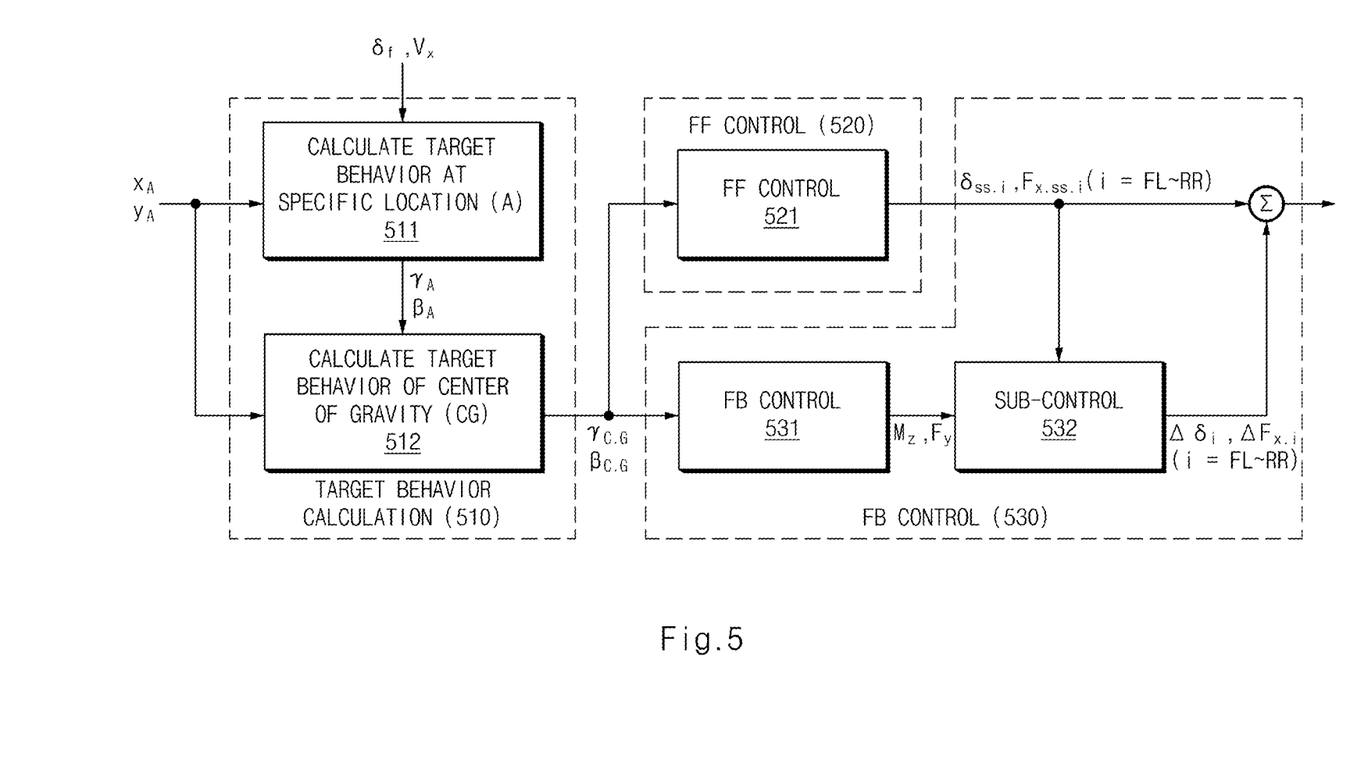
FIG. 5 is a diagram illustrating that a vehicle motion control apparatus controls a behavior of a vehicle, according to an embodiment of the present disclosure.

FIG. 5 is a diagram illustrating that a vehicle motion control apparatus controls a behavior of a vehicle, according to an embodiment of the present disclosure.

Referring to FIG. 5, the vehicle motion control apparatus 100 may perform target behavior calculation (510), feed forward (FF) control (520), and feedback (FB) control (530).

The vehicle motion control apparatus 100 may calculate a target behavior at the specific location (A) of a vehicle based on the vehicle's front-wheel steering angle ($\delta_f$), the vehicle's longitudinal speed ($V_x$), a longitudinal distance ($x_A$) from the vehicle's center of gravity to the specific location (A), and a lateral distance ($y_A$) from the vehicle's center of gravity to the specific location (A) (511).

For example, the vehicle motion control apparatus 100 may calculate the target behavior including a target lateral slip angle ($\beta_A$) and a target yaw rate ($\gamma_A$) at the specific location (A) of the vehicle.

The vehicle motion control apparatus 100 may calculate the target behavior of the center of gravity (C.G) of the vehicle based on the target lateral slip angle ($\beta_A$) at the vehicle's specific location (A), the target yaw rate ($\gamma_A$) at the vehicle's specific location (A), the longitudinal distance ($x_A$) from the vehicle's center of gravity to the specific location (A), and the lateral distance ($y_A$) from the vehicle's center of gravity to the specific location (A) (512).

For example, the vehicle motion control apparatus 100 may calculate the target behavior including the target lateral slip angle ($\beta_{C.G}$) and the target yaw rate ($\gamma_{C.G}$) of the vehicle's center of gravity (C.G).

The vehicle motion control apparatus 100 may calculate a basic control amount ($\delta_{ss,i}$) for the vehicle's steering angle and a basic control amount ($F_{x,ss,i}$) for the vehicle's braking/driving force based on the target lateral slip angle ($\beta_{C.G}$) and the target yaw rate ($\gamma_{C.G}$) of the vehicle's center of gravity (C.G) and then may perform a feed forward (FF)-based vehicle control (521).

For example, the vehicle motion control apparatus 100 may calculate the basic control amount ($\delta_{ss,i}$) for the vehicle's steering angle corresponding to each of the vehicle's four-wheels, and the basic control amount ($F_{x,ss,i}$) for the vehicle's braking/driving force ('i' may be one of front left (FL), front right (FR), rear left (RL), and rear right (RR)).

The vehicle motion control apparatus 100 may calculate a feedback control amount based on the target lateral slip angle ($\beta_{C.G}$) and target yaw rate ($\gamma_{C.G}$) of the vehicle's center of gravity (C.G) and then may perform a feedback (FB)-based vehicle control (531).

For example, the vehicle motion control apparatus 100 may calculate a feedback control amount including a control yaw moment ($M_z$) and a lateral force ($F_y$) through a proportional-integral-differential (PID) controller.

The vehicle motion control apparatus 100 may calculate a steering angle correction amount ($\Delta \delta_i$) corresponding to each of the four-wheels of the vehicle and a longitudinal braking/driving force correction amount ($\Delta F_{x,i}$) of the vehicle based on the basic control amount ($\delta_{ss,i}$) for the vehicle's steering angle corresponding to each of the vehicle's four-wheels, the basic control amount ($F_{ss,i}$) for the vehicle's braking/driving force, the control yaw moment ($M_z$), and the lateral force ($F_y$) and then may perform a feedback sub-control (532).

The vehicle motion control apparatus 100 may calculate a final steering angle control amount by summing the basic control amount ($\delta_{ss,i}$) and the steering angle correction amount ($\Delta \delta_i$) for the calculated steering angle of the vehicle so as to correspond to each of the four-wheels of the vehicle.

The vehicle motion control apparatus 100 may calculate the final braking/driving force control amount by summing the calculated basic control amount ($F_{x,ss,i}$) for the vehicle's braking/driving force and the braking/driving force correction amount ($\Delta F_{x,i}$) so as to correspond to each of the four-wheels of the vehicle.

Figure 6:
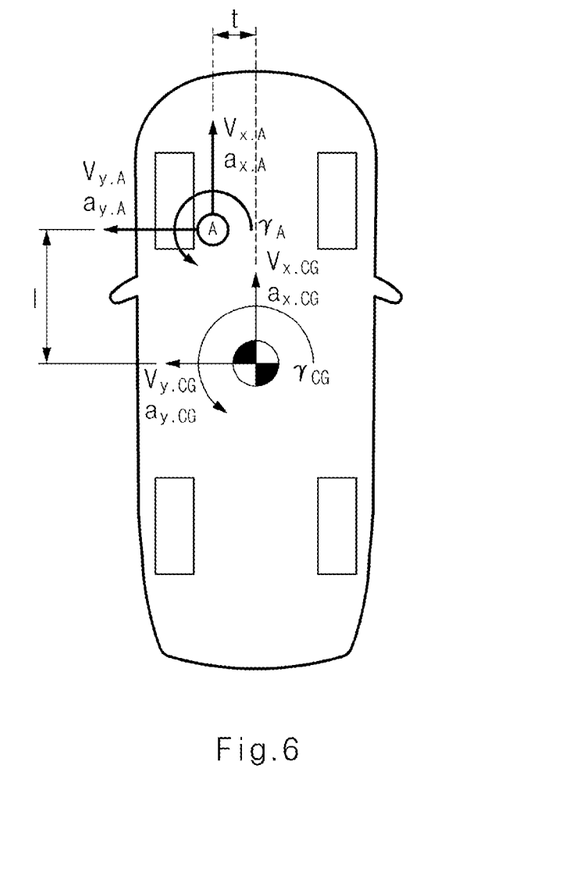
FIG. 6 is a diagram illustrating a vehicle model used by a vehicle motion control apparatus, according to an embodiment of the present disclosure.

FIG. 6 is a diagram illustrating a vehicle model used by a vehicle motion control apparatus, according to an embodiment of the present disclosure.

The vehicle motion control apparatus 100 may calculate a target lateral slip angle that minimizes acceleration or jerk based on the boarding location (A), by using a vehicle model.

The vehicle motion control apparatus 100 may calculate a target lateral slip angle that minimizes acceleration or jerk based on the boarding location (A), through Equation 2, Equation 3, and Equation 4 below.

$$\min k_{ax} a_{x.A}^2 + k_{ay} a_{y.A}^2 \quad \text{[Equation 2]}$$

$$\gamma = \gamma_A = \gamma_{CG} \quad \text{[Equation 3]}$$

$$a_{x.A} = a_{x.CG} - l\gamma^2 - t\dot{\gamma} \quad \text{[Equation 4]}$$
$$a_{x.CG} = \dot{V}_{x.CG} - V_{y.CG}\gamma \quad a_{x.A} = \dot{V}_{x.CG} - V_{y.CG}\gamma - l\gamma^2 - t\dot{\gamma}$$

$$a_{y.A} = a_{y.CG} + l\dot{\gamma} - t\gamma^2 \quad \text{[Equation 5]}$$
$$a_{y.CG} = \dot{V}_{y.CG} + V_{x.CG}\gamma \quad a_{y.A} = \dot{V}_{y.CG} + V_{x.CG}\gamma + l\dot{\gamma} - t\gamma^2$$

Here, $k_{ax}$ and $k_{ay}$ may be proportional constants for longitudinal acceleration and lateral acceleration and may be constants associated with preset ride comfort.

For example, the vehicle motion control apparatus 100 may calculate a target lateral slip angle that minimizes acceleration or jerk based on the boarding location (A), by applying an optimization method through Equation 2.

Equation 3 may be a kinematic equation for a yaw rate. $\gamma_{CG}$ may denote a target yaw rate at the center of gravity (CG) of the vehicle; $\gamma_A$ may denote a target yaw rate at the boarding location (A); and, $\gamma$ may denote a target yaw rate of the vehicle having a value the same as $\gamma_{CG}$ or $\gamma_A$.

Equation 4 and Equation 5 are kinematic equations for longitudinal acceleration and lateral acceleration. $a_{x.A}$ and $V_{x.A}$ may denote longitudinal acceleration and speed at the boarding location (A); and, $a_{x.CG}$ and $V_{x.CG}$ may denote longitudinal acceleration and speed at the center of gravity (CG) of the vehicle.

Furthermore, $a_{y.A}$ and $V_{y.A}$ may denote lateral acceleration and speed at the boarding location (A); and, $a_{y.CG}$ and $V_{y.CG}$ may denote lateral acceleration and speed at the center of gravity (CG) of the vehicle.

Moreover, 't' may denote a lateral distance from the vehicle's center of gravity (CG) to the boarding location (A); and, 'l' may denote a longitudinal distance from the center of gravity (CG) of the vehicle to the boarding location (A).

Because a yaw rate of the boarding location (A) is the same as a yaw rate of the center of gravity (CG), the vehicle motion control apparatus 100 may calculate a yaw rate that minimizes acceleration or jerk based on the boarding location (A) in the same method as a method of calculating a yaw rate that minimizes acceleration or jerk based on the center of gravity (CG).

Besides, an embodiment of minimizing acceleration is disclosed in the drawings and equations. However, it is also possible to calculate a lateral slip angle and a yaw rate that minimizes the jerk at the boarding location (A) in a similar way.

Figure 7:
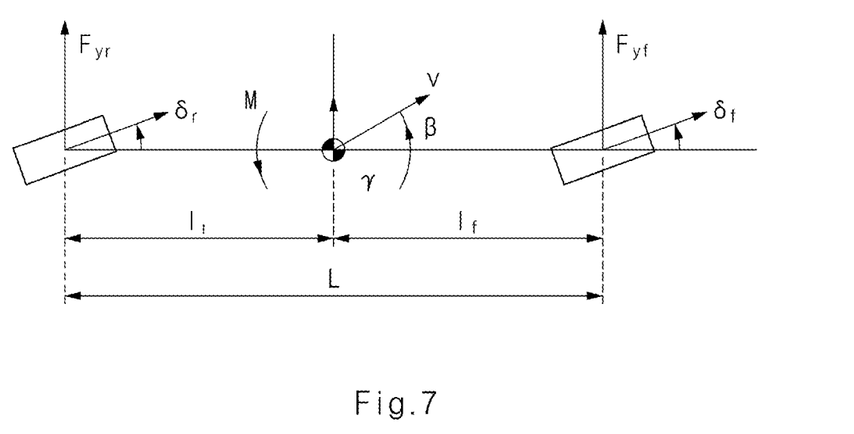
FIG. 7 is a diagram illustrating a vehicle model used by a vehicle motion control apparatus, according to another embodiment of the present disclosure.

FIG. 7 is a diagram illustrating a vehicle model used by a vehicle motion control apparatus, according to another embodiment of the present disclosure.

On the basis of a target lateral slip angle and target yaw rate for the center of gravity, the vehicle motion control apparatus 100 may calculate at least one of a steering angle, a driving torque, or a braking torque of a vehicle through a kinetic model or an inverse kinetic model based on a bicycle model or a bicycle inverse model.

The inverse kinetic model may refer to a dynamic equation for calculating a force or torque required to obtain a desired motion.

A relationship between the kinetic model and the inverse kinetic model based on the bicycle model is shown in Equation 6 below.

$$\dot{x} = Ax + Bu \implies U(s) = B^{-1}(sI-A)X(s) \quad \text{[Equation 6]}$$

The inverse kinetic model may be calculated based on an equation in s-space, which is obtained by transforming a differential equation of the kinetic model through Laplace equation or the like.

The differential equation for a bicycle model-based kinetic model may be shown in Equation 7 below.

$$\begin{bmatrix} \dot{\beta} \\ \dot{\gamma} \end{bmatrix} = \begin{bmatrix} \dfrac{-(C_f + C_r)}{mv_x} & \dfrac{(C_r l_r - C_f l_f)}{mv_x^2} - 1 \\ \dfrac{(C_r l_r - C_f l_f)}{I_z} & \dfrac{-(C_r l_r^2 + C_f l_f^2)}{I_z v_x} \end{bmatrix} \quad \text{[Equation 7]}$$

$$\begin{bmatrix} \beta \\ \gamma \end{bmatrix} = \begin{bmatrix} \dfrac{C_f}{mv_x} & \dfrac{C_r}{mv_x} \\ \dfrac{C_f l_f}{I_z} & -\dfrac{C_r l_r^2}{I_z} \end{bmatrix} \begin{bmatrix} \delta_f \\ \delta_r \end{bmatrix}$$

In this way, an equation for the calculated bicycle inverse model-based inverse kinetic model may be calculated as Equation 8 below.

[Equation 8]

$$\begin{bmatrix} \delta_{f,FF} \\ \delta_{r,FF} \end{bmatrix} =$$

$$\begin{bmatrix} \dfrac{mv_x l_r}{C_f(l_f + l_r)}s + 1 & \dfrac{I_z}{C_f(l_f + l_r)}s + \dfrac{C_f l_f (l_f + l_r) + l_r m v_x^2}{C_f(l_f + l_r) v_x} \\ \dfrac{mv_x l_f}{C_r(l_f + l_r)}s + 1 & -\dfrac{I_z}{C_r(l_f + l_r)}s + \dfrac{l_f m v_x^2 - C_r l_r (l_r + l_f)}{C_r(l_f + l_r) v_x} \end{bmatrix} \begin{bmatrix} \beta_{C.G} \\ \gamma_{C.G} \end{bmatrix}$$

Here, when β' and γ' are in a normal state having 0, an equation for an inverse kinetic model may be calculated as Equation 9 below.

[Equation 9]

$$\begin{bmatrix} \delta_{f,FF} \\ \delta_{r,FF} \end{bmatrix} =$$

$$- \begin{bmatrix} \dfrac{C_f}{mv_x} & \dfrac{C_r}{mv_x} \\ \dfrac{C_f l_f}{I_z} & -\dfrac{C_r l_r}{I_z} \end{bmatrix}^{-1} \begin{bmatrix} \dfrac{-(C_f + C_r)}{mv_x} & \dfrac{(C_r l_r - C_f l_f)}{mv_x^2} - 1 \\ \dfrac{(C_r l_r - C_f l_f)}{I_z} & \dfrac{-(C_r l_r^2 + C_f l_f^2)}{I_z v_x} \end{bmatrix} \begin{bmatrix} \beta \\ \gamma \end{bmatrix}$$

$$\begin{bmatrix} \delta_{f,FF} \\ \delta_{r,FF} \end{bmatrix} = \begin{bmatrix} 1 & \dfrac{C_f l_f (l_f + l_r) + l_r m v_x^2}{C_f(l_f + l_r) v_x} \\ 1 & \dfrac{l_f m v_x^2 - C_r l_r (l_r + l_f)}{C_r(l_f + l_r) v_x} \end{bmatrix} \begin{bmatrix} \beta_{C.G} \\ \gamma_{C.G} \end{bmatrix}$$

In Equation 7, Equation 8, and Equation 9, β and γ may denote a lateral slip angle and a yaw rate based on the center of gravity of a vehicle, respectively. Moreover, 'm' may denote the total weight of a vehicle; $v_x$ may denote a longitudinal speed of the vehicle; $C_f$ and $C_r$ may denote cornering stiffness of a front-wheel and cornering stiffness of a rear-wheel, respectively; $I_z$ may denote a moment of yaw inertia; and, $l_f$ and $l_r$ may denote distances from the center of gravity to the front-wheel and rear-wheel axles, respectively. $\delta_{f,FF}$ and $\delta_{r,FF}$ may denote steering angles of a front-wheel and a rear-wheel, respectively.

Finally, the vehicle motion control apparatus 100 may calculate a front-wheel steering angle ($\delta_{f,FF}$) and a rear-wheel steering angle ($\delta_{r,FF}$) based on a target yaw rate (γ) and a target lateral slip angle (β) through the inverse kinetic model.

Figure 8:
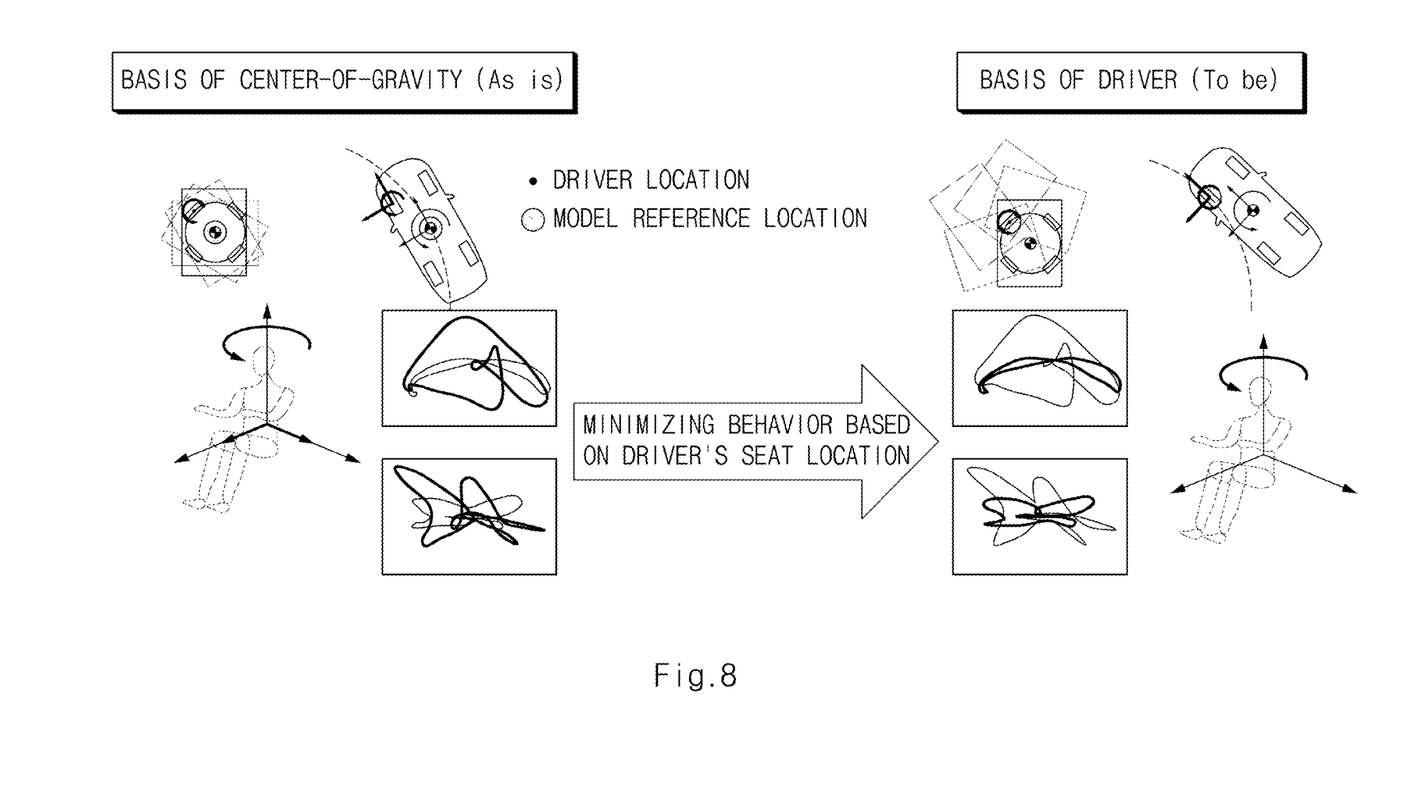
FIG. 8 is a diagram illustrating that a vehicle motion control apparatus controls the behavior of a vehicle based on a driver's location, according to an embodiment of the present disclosure.

FIG. 8 is a diagram illustrating that a vehicle motion control apparatus controls the behavior of a vehicle based on a driver's location, according to an embodiment of the present disclosure.

Referring to FIG. 8, when a method of minimizing acceleration or jerk based on a driver's boarding location is used as compared to a conventional method of minimizing acceleration or jerk based on the center of gravity, the acceleration or jerk experienced by a driver may decrease in longitudinal and lateral directions in driving.

In particular, when a method of minimizing acceleration or jerk based on the driver's boarding location is used, it may be identified through a graph that longitudinal acceleration or longitudinal jerk is greatly reduced.

Accordingly, the riding comfort experienced by a passenger may be improved.

As compared to a conventional technology, the effect of reducing the acceleration or jerk may be greatest at a rear seat boarding location for driving at low speed.

Figure 9:
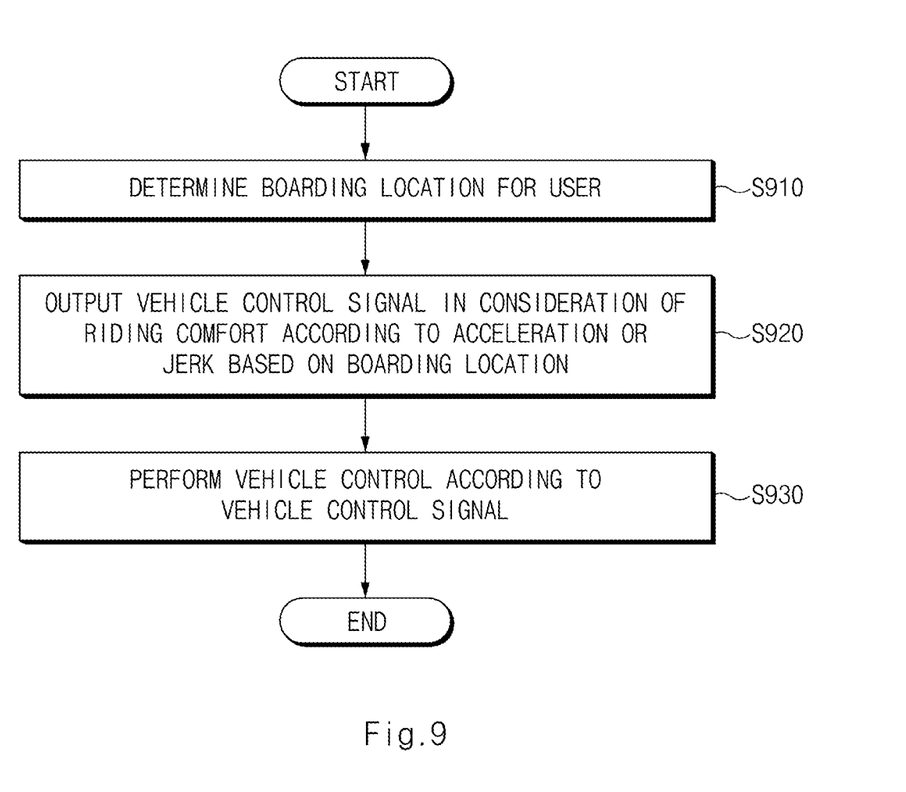
FIG. 9 is a flowchart illustrating a vehicle motion control method, according to an embodiment of the present disclosure.

FIG. 9 is a flowchart illustrating a vehicle motion control method, according to an embodiment of the present disclosure.

Referring to FIG. 9, a vehicle motion control method may include determining a boarding location for a user (S910), outputting a vehicle control signal in consideration of riding comfort according to acceleration or jerk based on a boarding location (S920), and performing vehicle control according to a vehicle control signal (S930).

The determining of the boarding location for the user (S910) may be performed by the processor 110 included in a vehicle.

For example, the vehicle motion control method may further include receiving, by an input device, information about the boarding location from the user.

For example, the determining of the boarding location for the user (S910) may include determining, by the processor 110, the boarding location based on the information about the boarding location received from the user.

For example, the vehicle motion control method may further include detecting, by a seating sensor provided in the vehicle, whether the user is seated at a seat of the vehicle.

For example, the determining of the boarding location for the user (S910) may include determining, by the processor 110, the boarding location based on detection information of the seating sensor.

The outputting of the vehicle control signal in consideration of the riding comfort according to the acceleration or the jerk based on the boarding location (S920) may be performed by the processor 110.

For example, the outputting of the vehicle control signal in consideration of the riding comfort according to the acceleration or the jerk based on the boarding location (S920) may include outputting, by the processor 110, the vehicle control signal including at least one of a steering signal, a driving signal, or braking signal for the vehicle.

For example, the outputting of the vehicle control signal in consideration of the riding comfort according to the acceleration or the jerk based on the boarding location (S920) may include calculating, by the processor 110, a target behavior including a target lateral slip angle and a target yaw rate at the boarding location, which minimizes the acceleration or the jerk at the boarding location.

For example, the outputting of the vehicle control signal in consideration of the riding comfort according to the acceleration or the jerk based on the boarding location (S920) may further include calculating, by the processor 110, the target behavior including the target lateral slip angle and the target yaw rate for a center of gravity of the vehicle corresponding to the calculated target behavior at the boarding location.

For example, the outputting of the vehicle control signal in consideration of the riding comfort according to the acceleration or the jerk based on the boarding location (S920) may further include calculating, by the processor 110, at least one of a steering angle, a driving torque, or a braking torque of the vehicle corresponding to the calculated target behavior for the center of gravity.

For example, the outputting of the vehicle control signal in consideration of the riding comfort according to the acceleration or the jerk based on the boarding location (S920) may further include calculating, by the processor 110, at least one of the steering angle, the driving torque, or the braking torque of the vehicle through a kinetic model or an inverse kinetic model based on a target lateral slip angle and the target yaw rate for the center of gravity.

The performing of the vehicle control according to the vehicle control signal may be performed by the controller 120.

For example, the performing of the vehicle control according to the vehicle control signal may include at least one of the vehicle's steering control, driving control, or braking control depending on the vehicle control signal.

For example, the vehicle motion control method may further include obtaining, by a sensor device provided in the vehicle, information about at least one of a wheel speed, a longitudinal acceleration, a lateral acceleration, a yaw rate, a steering angle, a driving torque, or a braking torque of the vehicle and feeding, by the processor 110, back at least one of a steering angle, a driving torque, or a braking torque based on the target behavior for the center of gravity and the information obtained by the sensor device.

The operations of the method or algorithm described in connection with the embodiments disclosed in the specification may be directly implemented with a hardware module, a software module, or a combination of the hardware module and the software module, which is executed by the processor. The software module may reside on a storage medium (i.e., the memory and/or the storage) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The exemplary storage medium may be coupled to the processor. The processor may read out information from the storage medium and may write information in the storage medium. Alternatively, the storage medium may be integrated with the processor. The processor and storage medium may be implemented with an application specific integrated circuit (ASIC). The ASIC may be provided in a user terminal. Alternatively, the processor and storage medium may be implemented with separate components in the user terminal.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

Descriptions of a vehicle motion control apparatus according to an embodiment of the present disclosure, and a method thereof are as follows.

According to at least one of embodiments of the present disclosure, it is possible to provide an apparatus for controlling the motion of a vehicle to improve riding comfort, and a method thereof.

Furthermore, according to at least one of embodiments of the present disclosure, it is possible to provide a vehicle motion control apparatus for providing driving stability to a passenger of an autonomous vehicle, and a method thereof.

Moreover, according to at least one of embodiments of the present disclosure, it is possible to provide a vehicle motion control apparatus for improving the riding comfort of a passenger in a turning situation of a four-wheel steering vehicle, and a method thereof.

Besides, according to at least one of embodiments of the present disclosure, it is possible to provide a vehicle motion control apparatus for improving riding comfort for future mobility having a high degree of control, and a method thereof.

Also, according to at least one of embodiments of the present disclosure, it is possible to provide a vehicle motion control apparatus for providing specialized ride comfort to a passenger at a specific location, and a method thereof.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle motion control apparatus comprising:
    a processor provided in a vehicle and configured to determine a boarding location for a user in the vehicle and to determine a vehicle control signal in consideration of riding comfort according to acceleration or jerk based on the boarding location for the user in the vehicle; and
    a controller configured to control the vehicle depending on the vehicle control signal, and wherein the processor is configured to:
    calculate a target behavior at the boarding location for the user in the vehicle to minimize the acceleration or the jerk at the boarding location, and
    calculate a target behavior for a center of gravity of the vehicle corresponding to the target behavior at the boarding location for the user in the vehicle,
    wherein the target behavior for the center of gravity comprises:
    a target yaw rate for the center of gravity of the vehicle being set equal to a target yaw rate at the boarding location for the user in the vehicle, and
    a target lateral slip angle for the center of gravity being set by subtracting a factor, which is proportional to a longitudinal distance from the center of gravity to the boarding location for the user in the vehicle, from the target lateral slip angle at the boarding location for the user in the vehicle, and
    wherein the processor is further configured to determine the target yaw rate at the boarding location for the user the in vehicle and the target lateral slip angle at the boarding location such that an acceleration at the boarding location for the user in the vehicle is minimized.

2. The vehicle motion control apparatus of claim 1, further comprising:
an input device configured to receive information about the boarding location from the user,
wherein the processor determines the boarding location based on the information about the boarding location received from the user.

3. The vehicle motion control apparatus of claim 1, further comprising:
a seating sensor configured to detect whether the user is seated at a seat of the vehicle,
wherein the processor determines the boarding location based on detection information of the seating sensor.

4. The vehicle motion control apparatus of claim 1, wherein the processor determines the vehicle control signal including at least one of a steering signal, a driving signal, or a braking signal for the vehicle, and
wherein the controller performs at least one of steering control, driving control, or braking control of the vehicle depending on the vehicle control signal.

5. The vehicle motion control apparatus of claim 1, wherein the processor calculates at least one of a steering angle, a driving torque, or a braking torque of the vehicle corresponding to the calculated target behavior for the center of gravity.

6. The vehicle motion control apparatus of claim 5, further comprising:
a sensor device configured to obtain information about at least one of a wheel speed, a longitudinal acceleration, a lateral acceleration, a yaw rate, a steering angle, a driving torque, or a braking torque of the vehicle,
wherein the processor feeds back at least one of a steering angle, a driving torque, or a braking torque based on the target behavior for the center of gravity and the information obtained by the sensor device.

7. The vehicle motion control apparatus of claim 1, wherein the processor calculates the at least one of a steering angle, a driving torque, or a braking torque of the vehicle through a kinetic model or an inverse kinetic model based on the target lateral slip angle and the target yaw rate for the center of gravity.

8. A vehicle motion controlling method, the method comprising:
determining, by a processor provided in a vehicle, a boarding location for a user in the vehicle;
determining, by the processor, a vehicle control signal in consideration of riding comfort according to acceleration or jerk based on the boarding location for the user in the vehicle; and
controlling, by a controller, the vehicle depending on the vehicle control signal,
wherein the determining, by the processor, of the vehicle control signal includes:
calculating a target behavior including a target lateral slip angle and a target yaw rate at the boarding location for the user in the vehicle, which minimizes the acceleration or the jerk at the boarding location for the user in the vehicle, and
calculating a target behavior including a target lateral slip angle and a target yaw rate for a center of gravity of the vehicle corresponding to the target behavior at the boarding location for the user in the vehicle, and wherein the target yaw rate for the center of gravity is set equal to the target yaw rate at the boarding location for the user in the vehicle,
wherein the target lateral slip angle for the center of gravity is set by subtracting a factor, which is proportional to a longitudinal distance from the center of gravity to the boarding location for the user in the vehicle, from the target lateral slip angle at the boarding location for the user in the vehicle, and
wherein the target yaw rate at the boarding location for the user in the vehicle and the target lateral slip angle at the boarding location for the user in the vehicle are set so that an acceleration at the boarding location for the user in the vehicle is minimized.

9. The method of claim 8, further comprising:
receiving, by an input device, information about the boarding location from the user,
wherein the determining, by the processor, of the boarding location for the user includes:
determining, by the processor, the boarding location based on the information about the boarding location received from the user.

10. The method of claim 8, further comprising:
detecting, by a seating sensor provided in the vehicle, whether the user is seated at a seat of the vehicle,
wherein the determining, by the processor, of the boarding location for the user includes:
determining, by the processor, the boarding location based on detection information of the seating sensor.

11. The method of claim 8, wherein the determining, by the processor, of the vehicle control signal includes:
determining, by the processor, the vehicle control signal including at least one of a steering signal, a driving signal, or a braking signal for the vehicle, and
wherein the controlling, by the controller, of the vehicle depending on the vehicle control signal includes:
performing, by the controller, at least one of steering control, driving control, or braking control of the vehicle depending on the vehicle control signal.

12. The method of claim 8, wherein the determining, by the processor, of the vehicle control signal further includes:
calculating, by the processor, at least one of a steering angle, a driving torque, or a braking torque of the vehicle corresponding to the calculated target behavior for the center of gravity.

13. The method of claim 12, wherein the determining, by the processor, of the vehicle control signal further includes:
calculating, by the processor, at least one of the steering angle, the driving torque, or the braking torque of the vehicle through a kinetic model or an inverse kinetic model based on the target lateral slip angle and the target yaw rate for the center of gravity.

14. The method of claim 12, further comprising:
obtaining, by a sensor device provided in the vehicle, information about at least one of a wheel speed, a longitudinal acceleration, a lateral acceleration, a yaw rate, a steering angle, a driving torque, or a braking torque of the vehicle; and
feeding back, by the processor, at least one of a steering angle, a driving torque, or a braking torque based on the target behavior for the center of gravity and the information obtained by the sensor device.

* * * * *